United States Patent [19]

Gaku et al.

[11] Patent Number: 4,904,760

[45] Date of Patent: Feb. 27, 1990

[54] THERMOSETTING RESIN COMPOSITION FROM CYANATE ESTER AND NON-BRANCHED AROMATIC COMPOUND

[75] Inventors: Morio Gaku; Hidenori Kimbara, both of Saitama; Mitsuo Eziri, Tokyo; Masakazu Motegi, Tokyo; Yousuke Funamoto, Tokyo, all of Japan

[73] Assignee: Mitsubishi Gas Chemical Co., Inc., Tokyo, Japan

[21] Appl. No.: 204,156

[22] Filed: Apr. 26, 1988

[30] Foreign Application Priority Data

| Apr. 27, 1987 | [JP] | Japan | 62-102011 |
| Jul. 9, 1987 | [JP] | Japan | 62-169657 |
| Jul. 28, 1987 | [JP] | Japan | 62-186695 |
| Aug. 26, 1987 | [JP] | Japan | 62-210246 |
| Aug. 26, 1987 | [JP] | Japan | 62-210247 |
| Sep. 3, 1987 | [JP] | Japan | 62-219065 |
| Sep. 11, 1987 | [JP] | Japan | 62-226488 |

[51] Int. Cl.$^4$ ............ C08G 61/00; C08G 81/00; C08L 79/00

[52] U.S. Cl. .................... 528/422; 525/55; 525/327.6; 525/327.9; 525/374; 528/211; 528/392

[58] Field of Search .......... 528/422, 392, 211; 525/55, 327.6, 327.9, 374

[56] References Cited

U.S. PATENT DOCUMENTS

| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,595,900 | 7/1971 | Loudas et al. | 260/453 |
| 3,694,410 | 9/1972 | Oehinke et al. | 260/47 |
| 3,740,348 | 6/1973 | Grigat et al. | 260/453 |
| 3,755,402 | 7/1973 | Grigal et al. | 260/453 |
| 4,022,755 | 5/1977 | Tanigaichi et al. | 260/59 |
| 4,026,913 | 6/1977 | Tanigaichi et al. | 260/463 |
| 4,110,364 | 8/1978 | Gaku et al. | 528/170 |
| 4,116,946 | 9/1978 | Jakob et al. | 528/172 |
| 4,578,439 | 3/1986 | Hefner, Jr. | 525/509 |

FOREIGN PATENT DOCUMENTS

| 1060933 | 3/1967 | United Kingdom . |
| 1305967 | 2/1973 | United Kingdom . |
| 1541529 | 3/1979 | United Kingdom . |

Primary Examiner—Harold D. Anderson
Attorney, Agent, or Firm—Browdy and Neimark

[57] ABSTRACT

A thermosetting resin composition polyfunctional cyanate ester resin composition comprising:

(I) a cyanate ester compound selected from the group consisting of a polyfunctional cyanate ester having at least two cyanate esters in its molecule, a prepolymer of such a cyanate ester and mixtures thereof; and (II) at least one non-branched aromatic compound in an amount of 5-40% by weight of the total resin composition, said aromatic compound having a number-average molecular weight of 178-800, an average number of aromatic nuclei of 2-6, and a boiling point of more than 300° C., and in which the portion having aromatic nuclei of 2-6 constitutes more than 50% is disclosed.

10 Claims, No Drawings

THERMOSETTING RESIN COMPOSITION FROM CYANATE ESTER AND NON-BRANCHED AROMATIC COMPOUND

BACKGROUND OF THE INVENTION

The present invention relates to a novel cyanate ester based thermosetting resin composition with its moisture resistance improved markedly in addition to improvements in other properties such as electrical characteristics. The improved moisture resistance and low dielectric characteristics of this resin composition render it suitable for use as a molding material, a prepreg, a laminate, an adhesive, a structural material, a paint, a solvent-less liquid casting resin, and in many other applications as well.

The cyanate ester thermosetting resin composition (I) is known by cyanate ester resins (e.g. U.S. Pat. Nos. 3,553,244, 3,755,402, 3,740,348, and 4,578,439, and DEP 1,190,184 and 1,195,764), cyanate ester-maleimide resins and cyanate ester-maleimide-epoxy resins (e.g., U.S. Pat. Nos. 4,110,364 and DEP 2,512,085), and cyanate ester-epoxy resins (e.g., U.S. Pat. No. 3,562,214 and DEP 1,720,663).

These thermosetting resin compositions have superior characteristics such as high heat resistance, high chemical resistance, good mechanical and electrical properties, and high solder resistance. However, they suffer from the disadvantage of lower resistance to hot steam than epoxy resin compositions. Although they exhibit lower values of dielectric constant, $\epsilon$ and dissipation factor, $\tan \delta$ than other thermosetting resins such as epoxy resins, still lower values are required to meet engineering standards that are becoming more and more strict these days.

The prior art cyanate ester based thermosetting resin compositions have been produced principally by one of the following methods: incorporating in cyanate ester thermosetting resins those low-molecular weight resins which are substantially free of functional groups, such as polystyrene, polyphenylene ether resins, and other thermoplastic resins having molecular weights of the order of $10^3$; or using cyanate ester thermosetting resins in combination with thermosetting resins having functional groups, such as polyfunctional maleimide resins, epoxy resins, diallyl phthalate resins, silicone resins, phenolic resins, phenol novolak resins, phenol-modified xylene resin, poly(acrylate), divinylbenzene and styrene. However, these methods have not proved to be completely satisfactory for the purpose of solving the aforementioned problem of poor resistance to hot steam compared with epoxy resin compositions.

It has been proposed that these known compositions be rendered flame-retardant by incorporating a variety of halogen-containing organic compounds, such as bromated polycarbonate oligomers having average degrees of polymerization of 2–15 or bromated epoxy resins. This method is effective in improving the flame retardancy of the compositions of interest but not in improving their resistance to hot steam and the best result that can be attained is that substantial deterioration of this property is avoided.

Conventionally, the properties of cyanate ester based resin compositions have been improved by either one of the following methods: they are cured or subjected to crosslinking reaction in the presence of compounds having functional groups that are reactive with the cyanato group; or in an attempt to provide ease of handling by allowing some deterioration of physical properties, the necessary physical properties are imparted by adding low-molecular weight resins (m.w. of the order of $10^3$) that are miscible at low temperatures. No technique has been available that is capable of achieving dramatic improvement in the resistance to hot steam of cyanate ester based resin compositions.

SUMMARY OF THE INVENTION:

The present inventors conducted intensive studies in order to improve the resistance to hot steam (resistance to hydrolysis) of cyanate ester based resin compositions while retaining or improving their properties in other aspects including heat resistance, chemical resistance, and electrical characteristics, notably dielectric constant and dissipation factor. As a result, the present inventors unexpectedly found that when resins or compounds having smaller molecular weights than the low-molecular weight resins that had previously been considered to be effective for handling purposes only were mixed with the cyanate ester based resin composition, followed by reaction under heating, a kind of "clathrate compounds" formed in which the incorporated resins or compounds were dispersed uniformly in molecular form. The product obtained by curing the resulting composition was significantly improved with regard to the aforementioned problems of the prior art. The present invention has been accomplished on the basis of this finding.

The present invention relates to a thermosetting resin composition consisting of a cyanate ester thermosetting resin composition (I) and an aromatic compound (II), said composition (I) containing as an essential component a polyfunctional cyanate ester having at least 2 cyanato groups in the molecule or a prepolymer of said cyanate ester, and said compound (II) having no branched structure, a number average molecular weight of 178–800 and 2–6 aromatic nuclei on average, with the total content of components having 2–6 aromatic nuclei being at least 50 wt %, and a boiling point of at least 300° C., and being present in an amount of 5–40 wt % of the resulting thermosetting resin composition.

DETAILED DESCRIPTION OF THE INVENTION:

The present invention is described hereinafter in detail.

As already mentioned, the cyanate ester thermosetting resin composition (I) has been known by cyanate ester resins (e.g., U.S. Pat. Nos. 3,553,244, 3,755,402, 3,740,348 and 4,578,439, and DEP 1,190,184 and 1,195,764), cyanate ester-maleimide resins and cyanate ester-maleimide-epoxy resins (e.g., U.S. Pat. No. 4,110,364 and DEP 2,512,085), and cyanate ester-epoxy resins (e.g., U.S. Pat. No. 3,562,214 and DEP 1,720,663).

Suitable cyanate ester compounds that may be employed in the present thermosetting resin composition have the formula:

$$R(OCN)_n \tag{4}$$

where n is an integer of at least 2 and one or more aromatic groups which may contains heterocyclic ring(s) and the cyanato groups are bonded to the aromatic ring.

Examples of these cyanate ester compounds include 1,3- or 1,4-dicyanato benzene, 1,3,5-tricyanatobenzene, 1,3-, 1,4-, 1,6-, 1,8-, 2,6- or 2,7-dicyanate naphthalene, 1,3,6-tricyanato naphthalene, 4,4'-dicyanato biphenyl, bis(4-dicyanatophenyl)methane, bis(3,5-dimethyl-4-dicyanatophenyl)methane, 2,2-bis(4-cyanatophenyl)propane, 2,2-bis(3,5-dichloro-4-cyanatophenyl)propane, 2,2-bis(3,5-dibrome-4-cyanatophenyl)propane, 2,2-bis(3,5-dimethyl-4-cyanatophenyl)propane, bis(4-cyanatophenyl)ether, bis(4-cyanatophenyl)thioether, bis(4-cyanatophenyl)sulfone, tris(4-cyanatophenyl)phosphite, tris(4-cyanatophenyl)phosphate, polyfunctional novolak-cyanates obtained by reacting novolak with a cyanogen halide (U.S. Pat. Nos. 4,022,755 and 3,448,079), polyfunctional polycarbonatecyanates obtained by reacting an OH-terminated polycarbonate oligomer with a cyanogen halide (U.S. Pat. No. 4,026,913 and DEP 2,611,796) and styryl pyridine cyanate obtained by reacting a cyanogen halide with a poly-hydroxy-styryl-pyridine obtained by reacting a hydroxy benzaldehyde with an alkyl-substituted pyridine (U.S. Pat. No. 4,578,439). Other suitable cyanate ester compounds are given in U.S. Pat. Nos. 3,553,244; 3,755,402; 3,740,348; 3,595,900; 3,694,410 and 4,116,946, GBP 1,305,967 and 1,060,933, DEP 1,190,184 and 1,195,764. These U.S. Patents and D.E. Patents are incorporated herein by way of reference.

The above polyfunctional cyanate ester can be used as it is, or as a prepolymer having a cyanato group or cyanato groups in its molecule obtained by heating the above polyfunctional cyanate ester in the presence or absence of a mineral acid, Lewis acid, a salt such as sodium carbonate or lithium chloride, a phosphate such as tributyl phosphine. These prepolymers have a sym-triazine ring obtained by trimerizing the CN group in the cyanate ester. It is preferable that the prepolymers have a number average molecular weight of 300–6000.

The cyanate ester compound (I) of this invention may contain epoxy resin, polyfunctional maleimide and other resins.

The epoxy resins which can be incorporated into the cyanate ester compound are those which are used as laminates, electronic materials or rigid resin moldings in the prior art.

Examples of these epoxy resins include bisphenol A type epoxy resin, bisphenol F type epoxy resin, phenol-novolak type epoxy resin, cresol-novolak type epoxy resin, 1,3,5-tri(4-glycidyloxybenzyl)benzene, halogenated bisphenol A type epoxy resin, halogenated phenol novolak type epoxy resin, polyglycol type epoxy resin, alicyclic epoxy resin, and polyfunctional epoxy compounds obtained by reacting xylylene diamine with an epihalohydrin. These epoxy resins can be used alone or as a mixture.

Polyfunctional maleimides may be prepared by reacting a maleic anhydride with a polyamine having 2–5 amino groups to form a maleamide acid, followed by dehydrationcyclizing the maleamide acid. This process is known in the art. It is preferable that the polyamines are aromatic polyamines, because the resulting final products have excellent thermal resistance. In order to prepare flexible final products, on alicyclic polyamine or a mixture of an aromatic polyamine and an alicyclic polyamine can be used. Primary polyamines are preferred because they are reactive. However, secondary polyamines can also be used.

Examples of suitable polyamines include meta- or para-phenylene diamine, meta- or para-xylylene diamine, 1,4- or 1,3-cyclohexane diamine, tetrahydroxylylene diamine, 4,4'-diaminobiphenyl, bis(4-aminophenyl)methane, bis(4-aminophenyl)ether, bis(4-aminophenyl)sulfone, bis(4-amino-3-methylphenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(4-amino-3-chlorophenyl)propane, bis(4-amino-3-chlorophenyl)methane, 2,2-bis(4-amino-3,5-dibromophenyl)propane, bis(4-aminophenyl)phenylmethane, 3,4-diaminophenyl-4-aminophenyl-methane, 1,1-bis(4-aminophenyl)-1-phenylethane, melamines having sym-triazine ring and polyamine in which two benzene rings are bonded through methylene group, obtained by reacting aniline with formalin.

The maleimide can be used in a monomeric or prepolymeric form or as a prepolymer with the above amine.

As already specified above, the aromatic compound (II) used in the present invention has a number average molecular weight of 178–800, 2–6 aromatic nuclei on average, with components having 2–6 aromatic nuclei being present in a total amount of at least 50 wt %, and a boiling point of at least 300° C. This is a compound or resin having no branched structure.

Various problems will occur if one or more of the conditions set forth above are not met. If the number average molecular weight is less than 178, or if the average number of aromatic nuclei is less than 2, or if the boiling point is less than 300° C., the product obtained by curing the resulting composition will have a very low resistance to heat, or in some instances, its chemical resistance is impaired. If the number average molecular exceeds 800, or if the average number of aromatic nuclei is more than 6, or if the total content of components having 2–6 aromatic nuclei is less than 50 wt %, or if the compound (II) has a branched structure, the components of comparatively high molecular weights (corresponding to those of the conventional low-molecular weight resins) that are present in the compound (II) will impede the curing reaction (creation of a cross-linked structure) of resin component (I). In some instances, the component (II) fails to be uniformly dispersed in molecular form in the cross-linked structure of the component (I) and the tendency of it becoming dispersed in the form of microparticles or undergoing phase separation will be increased. In either case, the effectiveness of component (II) in improving resistance to hot steam will be lost. In order to produce a composition having good storage stability, the component (II) preferably has a minimum number of a functional groups that will react with the cyanato groups in component (I). Functional groups that will readily self-polymerize during the curing reaction of the composition (such as residual vinyl groups in polystyrene) contribute to the formation of an undesirable high-molecular weight material by virtue of the production of a self-polymerization product. Therefore, the smaller the content of such self-polymerizable functional groups, the better. Taking polystyrene as an example, it preferably contains no more than 0.2 of such groups per molecule.

If the content of the aromatic compound (II) is less than 5 wt % of the resulting thermosetting composition, satisfactory improvement in the resistance of hot steam cannot be attained. If the content of the compound (II) exceeds 40 wt %, the chance of the formation of a phase solely composed of that compound is increased and its uniform dispersion in molecular form will be impaired to cause rapid deterioration of not only hot steam resistance but also other properties. Preferably, the content of the aromatic compound (II) is within the range of 5-35 wt %, more preferably 10-25 wt %, of the resulting thermosetting composition.

Any of the compounds that are included within the definition of aromatic compound (II) are effective for the purpose of providing improved resistance to hot steam. In addition, they contribute to improvements in various other properties depending on their type, so it is recommended to use them in various combinations according to the specific use of the final resin composition.

Included within the definition of aromatic compound (II) are compounds represented by the following general formula (1), compounds represented by the following general formula (2), coumarone-indene resins or aromatic petroleum resins having softening points in the range 60° -120° C., and anthracene, phenanthrene or polynuclear aromatic compounds in which part of the hydrogen atoms on these nuclei are substituted by a lower alkyl group or a bromine atom, the above listed compounds or resins being used either on their own or as admixtures:

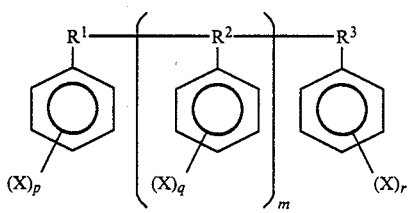

where $R^1$ and $R^3$ are each $-CHR-CH_2-$,

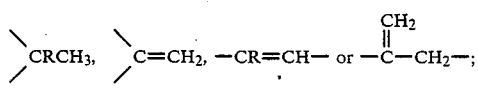

$R^2$ is $>CR-CH_2-$ (where R is a hydrogen atom or a methyl group); X is a halogen atom, or a lower alkyl or alkoxy group having 1-3 carbon atoms; m is a positive number of 0.5-3; and p, q and r are each an integer of 0-5;

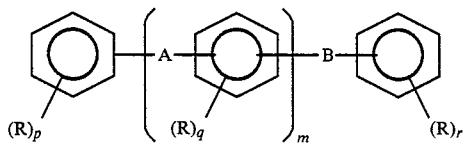

where A and B which may be the same or different each represents a simple bond, —O—, a lower alkylene group having 1-3 carbon atoms, or $-CH_2O-$, $-CH_2OCH_2-$ or $-CH_2OCH_2OCH_2-$; R which may be the same or different represent a halogen atom, a lower alkyl or alkoxy groups having 1-3 carbon atoms, or $-CH_2OH$; m is 0 or a positive number of up to 3; p and r are each an integer of 0-5; and q is an integer of 0-4.

Examples of the compounds of formula (1) are ultra-low-molecular weight polystyrenes that are prepared by polymerizing aromatic vinyl compounds such as styrene, vinyltoluene, α-methylstyrene, nuclear chlorinated or bromated styrene and which have 2.6-4.8 aromatic nuclei on average, with components having 2-5 aromatic nuclei being present in a total amount of at least 70 wt %. Polystyrenes having 2.6-4 aromatic nuclei on average are preferred, with those containing 2.8-3.6 aromatic nuclei being particularly preferred. It is essential that the number of unsaturated double bonds as functional groups be no more than 0.2, and the smaller the content of such functional groups, the better. Such low-molecular weight polystyrenes usually contain small amounts of unreacted monomers, which will either deteriorate the resistance of the resulting composition to heat or organic solvents (chemicals) or evaporate as volatile components during preliminary reactions, or form polymers having more than 5 aromatic nuclei on average. Since these unreacted monomers are detrimental to the objective of the present invention, their content in the above listed polystyrenes is preferably as low as possible. Obviously, such ultra-low-molecular weight polystyrenes are preferably freed of any residual unsaturated double bond by a suitable technique such as hydrogenation.

Examples of the compounds of formula (2) include polybromodiphenyl ether, diphenylbenzene, phenylxylylethane represented by the following general formula (3), and low-molecular weight aromatic hydrocarbon resins which have been freed of functional groups as much as possible:

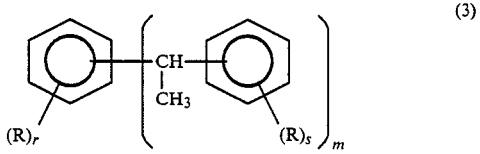

where R is a halogen atom or a lower alkyl group; m is an integer of 1 or 2; and r and s are each 0-3.

Polybromodiphenyl ether is a compound in which part or all of the hydrogen atoms on the benzene rings of diphenyl ether are substituted by bromine atoms. Specific examples of polybromodiphenyl ether include decarbromodiphenyl ether, octabromodiphenyl ether, hexabromodiphenyl ether, pentabromodiphenyl ether, tetrabromodiphenyl ether, tribromodiphenyl ether, dibromodiphenyl ether and mixtures thereof. From the viewpoint of handling such as dissolution in general-purpose solvents, mixtures that are liquid at ordinary temperatures and which have 2-6 substitutions with bromine atoms, in particular, about 4 substitutions with bromine atoms on average, are used with advantage.

Diphenylbenzene (i.e., terphenyl) may be unsubstituted, such as o- (m.p. 58° C.), m- (m.p. 89° C.) and p- (m.p. 213° C.), or substituted with bromine atoms, lower alkyl groups or lower alkoxy groups on the aromatic nuclei.

Phenylxylylethane is a compound represented by the above-noted general formula (3) and is usually a high-boiling point aromatic hydrocarbon compound that is prepared by reacting an optionally alkyl-substituted benzene such as toluene, ethylbenzene or xylene with an aromatic monovinyl compound such as styrene, vinyltoluene or dimethylvinylbenzene in the presence of a Friedel-Crafts catalyst. Compounds of formula (3) which are prepared from xylene and styrene are easily available but those wherein m is 1 have boiling points in the range of 290°-305° C. and will significantly impair the heat and chemical resistance of the resulting composition. High-boiling compounds of formula (3) that contain three nuclei are preferred since they will cause less deterioration of resistance to heat and chemicals. Those which contain two nuclei may of course be used with advantage if they are converted to high-boiling compounds as by nuclear substitution with bromine atoms.

Illustrative aromatic hydrocarbon resins are those based on methylene bonds such as xylene resins and mesitylene resins that are produced by subjecting dimethylbenzene, trimethylbenzene, ethylbenzene, methylethylbenzene or other lower-alkyl-substituted aromatic hydrocarbons to reaction, typically with formaldehyde or trioxane under conditions that minimize the chance of formation of functional groups. If, after this reaction, active oxygen remains unreacted forms a functional groups such as methylol, a suitable post-treatment may be performed to remove such active oxygen or render it inactivate. If methylol groups or other functional groups are present in the aromatic hydrocarbon resin employed, the latter will not have a sufficient ability to impart adequate hot steam resistance to the resulting composition when it is cured. The presence of such functional groups is also undesirable since it impairs the storage stability of the composition. The aromatic hydrocarbon resin preferred for use in the present invention contains 2-5 aromatic nuclei on average, with components having 2-5 aromatic nuclei being present in a total amount of at least 50 wt %, particularly at least 65 wt %. Besides these conditions, the most preferred aromatic hydrocarbon resin satisfies the requirement for the substantial absence of functional groups.

The coumarone-indene resin or aromatic petroleum resin having a softening point of 60°-120° C. is a low-molecular weight thermoplastic resin that is obtained by separating a mixture of reactive aromatic unsaturated compounds from coal or heavy petroleum oils and by polymerizing the mixture in the presence of a catalyst without separating it into the individual monomers. Examples are coumaroneindene resins mainly consisting of three monomers, i.e., styrene, indene and coumarone, and aromatic petroleum resins obtained by polymerizing monomers chiefly consisting of styrenes such as styrene, vinyltoluene and α-methylstyrene, and indenes such as indene and methylindene. Resins having softening points of less than 60° C. (less than 270 in number average molecular weight) contain increased amounts of low-molecular weight materials having boiling points of less than 300° C. and not only is the chance of bleeding increased but also the chemical resistance of the resulting composition is impaired. If resins having softening points exceeding 120° C. (at least 6.5 aromatic nuclei on average), the formation of a "clathrate compound" confined in the network structure created by a cyanate ester is inhibited by a greater extent and the ability of the resins to improve resistance to hot steam is not fully exploited. The coumarone-indene resin or aromatic petroleum resin having a softening point of 60°-120° C. usually contains about 0.4-0.5 carbon-carbon unsaturated double bonds per molecule. The reactivity of this functional group with component (I) is too small to cause problems such as low storage stability. This functional group also has the advantage that it does not easily enter into self-polymerizing reaction. In spite of these advantages, the presence of such functional groups should preferably by minimized and it is more preferable to remove them by hydrogenation or some other suitable method.

Specific examples of anthracene, phenanthrene and polynuclear aromatic compounds in which part of the hydrogen atoms on these nuclei are substituted by a lower alkyl group or a bromine atom include anthracene, phenanthrene, dibromoanthracene and methylanthracene.

The proportions of components (I) and (II) used in the present invention are usually such that component (I) is employed in an amount of 60-95 wt %, preferably 65-95 wt %, more preferably 75-90 wt %, and component (II) in an amount of 5-40 wt %, preferably 5-35 wt %, more preferably 10-25 wt %. The specific examples listed above for each components may be used either on their own or as admixtures.

An epoxy resin which is advantageously used in combination with component (I) is preferably added in an amount not exceeding the amount of the polyfunctional cyanate ester component in order to ensure its effectiveness in improving resistance to hot steam. The polyfunctional maleimide component is highly effective in improving heat resistance but it has the tendency to deteriorate resistance to hot steam. Therefore, this component is preferably used in an amount not exceeding one half the amount of the polyfunctional cyanate ester component.

There is no particular limitation on the method that can be employed to prepare the thermosetting resin composition of the present invention which contains components (I) and (II) as essential ingredients. Suitable methods are: (i) preparing a batch containing all necessary components and mixing them in molten state in the absence of a solvent; (ii) subjecting the respective components, either on their own or in admixture, to a preliminary reaction, adding the remaining necessary components, and mixing them all in molten state in the absence of a solvent; (iii) during the mixing step of process (ii), other components that are known to be usable in the manufacture of cyanate ester based resin compositions are added and the mixture is processed into a solventless composition in either liquid or paste form, or into a solution. Any of these methods can be employed as appropriate.

The present resin composition can be cured by heating without any catalyst or any curing agent. However, a catalyst or a curing agent may be added to the present resin composition in order to promote curing of the composition.

Examples of suitable catalysts and curing agents include organic peroxides, such as benzoyl peroxide, lauroyl peroxide, capryl peroxide, acetyl peroxide, para-chlorobenzoyl peroxide and di-tert.-butyl-diperphthalate; azo compounds, such as azobis-nitrile; imidazoles, such as 2-methyl imidazole, 2-undecyl imidazole, 2-heptadecyl imidazole, 2-phenyl imidazole, 2-ethyl-4-methyl imidazole, 1-benzyl-2-methyl imidazole, 1-propyl-2-methyl imidazole, 1-cyanoethyl-2-methyl imidazole, 1-cyanoethyl-2-ethyl imidazole, 1-cyanoethyl-2-undecyl imidazole, 1-cyanoethyl-2-phenyl imidazole, 1-cyanoethyl-2-ethyl-4-methyl imidazole and 1-guanaminoethyl-2-methyl imidazole; addition products of one of these imidales and a carboxylic acid or an anhydride thereof; tertiary amines, such as N,N-dimethyl benzylamine, N,N-dimethyl toluidine, N,N-dimethyl-p-anisidine, N,N-dimethyl aniline, p-halogeno-N,N-dimethyl aniline, 2-N-ethylanilino ethanol, tri-n-butyl amine, pyridine, quinoline, N-methyl morpholine, triethanol amine, triethylene diamine, N,N,N',N'-tetramethyl butanediamine and N-methyl piperidine; phenols, such as phenol, xylynol, cresol, resorcinol, catechol and phloro glycine; organic metal salts, such as lead naphthenate, lead stearate, zinc naphthenate, zinc octoate, tin oleate, dibutyltin maleate, manganese naphthenate, cobalt naphthenate and acetyl acetone iron; a solution in which one or more of these metal salts is dissolved in a hydroxy-containing compound, such as phenol or biphenyl; inorganic metal salts such as $SnCl_3$, $ZnCl_2$ and $AlCl_3$; organic tin compounds, such as dioctyltin oxide, alkyl tin compounds and alkyltin oxides; and acid anhydrides, such as maleic anhydride, phthalic anhydride, lauric anhydride, pyromellitic anhydride, trimellitic anhydride, hexahydrophthalic anhydride, hexahydrotrimellitic anhydride and hexahydropyromellitic anhydride.

Such catalyst or curing agent can be used in a tatalytic amount, usually used in an amount of less than 10 wt %.

A variety of additives may be incorporated into the composition, in such amounts that the properties of the present curable resin compositions are not impaired. These additives include natural or synthetic resins, inorganic or organic fibrous reinforcing materials or fillers, dyes, pigments, thickeners, lubricants, coupling agents, self-extinguishing agents and the like. Two or more of these additives may be added to the composition.

Examples of natural or synthetic resins include polyvinyl acetal resins, such as polyvinyl formal, polyvinyl acetal and polyvinyl butyral; phenoxy resins; acryl resins; alkid resins; thermoplastic polyurethane resins; non-cross-linked (or non-vulcanized) rubbers, such as polybutadine, butadiene-acrylonitrile copolymer, polychloroprene, butadiene-styrene copolymer, polyisoprene, butyl rubber and natural rubbers; vinyl compound polymers, such as polyethylene, polypropylene, polybutene, poly-4-methylpentene-1-, polyvinyl chloride, polyvinylidene chloride resin, polystyrene, polyvinyl toluene, polyvinyl phenol, polyvinyl pyrrolidone, AS resin, ABS resin, MBS resin, polytetrafluoroethylene, tetrafluoroethylene-hexafluoropropylene copolymer and poly(fluonated)vinylidene; resins, such as polycarbonate, polyester carbonate, polyphenylene ether, polysulfone, polyester, polyether sulfone, polyamide, polyamideimide, polyester imide and polyphenylene sulfide; polymers of these thermoplastic resins with a molecular weight of one thousand to several thousand; elastomers of these resins; poly(meth)acrylates, such as poly(meth)acrylate, polyfunctional poly(meth)acrylates, polyalkyl(meth)acrylates, epoxy(meth)acrylates and di(meth)acryloxy-bisphenol; polyallyl compounds, such as polydiallyl phthalate, poly divinylbenzene, poly diallylbenzene, diallyl ether bisphenol and trialkenyl isocyanurate; prepolymers of these compounds; and thermosetting monomers or prepolymers, such as dicyclopentadiene or a prepolymer thereof, phenol resin and polyisocyanates.

Examples of suitable reinforcing agents or fillers include inorganic fibers, such as glass fibers, silica glass fibers, carbon fibers, alumina fibers, silicon carbide fibers, asbestos, rock wool, slag wool and gypsum whisker; woven or non-woven fabric made of these fibers; organic fibers, such as aromatic polyamide fibers, polyimide fibers, fluorine fibers, polyester fibers, cotton, hemp and semicarbon fibers; woven or non-woven fibers made of these fibers; fibers of a metal selected from copper, copper alloy, such as brass, aluminum, aluminum alloy, iron, iron alloy, lead, manganese, magnesium, nickel, chrome, tin, zinc, silver, gold, platinum titanium, cobalt and stainless steel; fabrics made of these fibers; fabric blends, such as a fabric blend of glass fibers and aromatic polyamide fibers, a fabric blend of glass fibers and carbon fibers and a fabric blend of a glass fibers and polyimide fibers; inorganic papers such as glass paper, mica paper and alumina paper; fibrous reinforcing materials, such as graft paper, cotton paper and a paper blend of paper and glass fibers; and powderous or lamellar fillers, such as glass, molten glass, silica, fused silica, synthenic silica, silicon carbide, alumina, aluminum nitride, silica alumina, boron nitride, titanium oxide, woolastonite, mica, synthetic mice, gypsum, calcium carbonate, magnesium carbonate and magnesium oxide.

The present curable resin compositions have excellent physical properties, workability and low toxicity, so they can be used in a variety of fields. That is, they can be used as coating materials, adhesives, prepreg, materials for laminates, molding materials and non-solvent casting materials. They can also be used as resin components for preparing electrical parts, structural composites and resin moldings.

The curing conditions for preparing laminates and structural composites using the present composition depend on the kinds of catalysts or curing agents and the kinds of components which constitute the compositions. The gelling or precuring of the present resin composition can be carried out at a temperature of less than 100° C. The complete curing of the resin composition can be carried out at a temperature of 100°–300° C. It is preferable that the laminate with the resin composition or the structural composite with the resin composition is compressed in the case of heat-curing it. A pressure of 0.1–500 kg/cm$^2$.G can be applied, preferably 5–150 kg/cm$^2$.G.

This invention is further explained in the following non-limiting examples. All parts and percents are on a weight basis, unless specified otherwise.

EXAMPLE 1 (VERY LOW MOLECULAR WEIGHT POLYSTYRENE)

2,2-Bis(4-cyanatophenyl)propane (hereinunder referred to as BPA-CN) or 2,2-bis(4-cyanatophenyl)sulfone (hereinunder referred to as BPS-CN) and each of polystyrenes (trade name: PICCOLASTIC A Resin, Hercules Inc.) which are normally liquid or solid as shown in the following table were melt-blended in proportions as given in Table 1 at 100° C., cast into a mold at 100° C., and degassed at 100° C. and 2 mmHg for 15 minutes.

| Trade name | Softening point (°C.) | $\overline{Mn}$ | Bromine value | Functionality | Number of aromatic nuclei rings per molecule | Proportion of polystyrenes having 2-5 nuclei (%) |
|---|---|---|---|---|---|---|
| A 5 | 5 | 300 | 6.0 | 0.11 | 2.88 | 93 |
| A 50 | 50 | 370 | 4.0 | 0.09 | 3.56 | 88 |
| A 75 | 75 | 400 | 2.0 | 0.05 | 3.85 | — |
| D 100 | 100 | 800 | — | — | 7.69 | — |

Thereafter, the compositions were heat-cured in an oven at 180° C. for 8 hours and at 240° C. for additional 12 hours to obtain cast plates 4 mm thick. The resulting plates were subject to Pressure Cooker Test (hereinunder referred to as PCT). The results are shown in Table 1.

PCT was carried out at 3 atmospheres and 133° C. How many hours the appearances of the samples are impaired were measured (hereinunder referred to as "aging time"). Water absorptions after 100 hours (hereinunder referred to as water absorption) were also measured.

Dielectric constants ε and dissipation factor (tan δ) of No. 8 and 9 plates were measured at 1 MHz and 25° C. The results are shown below:

|  | ε | tan δ |
|---|---|---|
| No. 8 plate | 3.0 | 0.0013 |
| No. 9 plate | 2.9 | 0.0007 |

TABLE 1

| | | Ex. 1 | Ex. 2 | Ex. 3 | Control 4 | Control 5 | Control 6 | Ex. 7 | Ex. 8 | Ex. 9 | Ex. 10 | Ex. 11 | Control 12 | Ex. 13 | Ex. 14 |
|---|---|---|---|---|---|---|---|---|---|---|---|---|---|---|---|
| Resin (parts) | BPA-CN | 85 | 85 | 85 | 85 | 100 | | 85 | 90 | 80 | 70 | 67.5 | 67.5 | 38.5 | 38.5 |
| | BPS-CN | | | | | | 100 | | | | | | | | |
| | A 5 | 15 | | | | | | 15 | 10 | 20 | 30 | 15.0 | | 15.0 | |
| | A 50 | | 15 | | | | | | | | | | | | |
| | A 75 | | | 15 | | | | | | | | | | | |
| | D 100 | | | | 15 | | | | | | | | | | |
| | BMI | | | | | | | | | | | 7.5 | 7.5 | 16.5 | 16.5 |
| | EP-826 | | | | | | | | | | | 10.0 | 10.0 | 30.0 | 30.0 |
| PCT | aging time (hrs.) | 300 | 300 | 250 | 70 | 50 | 70 | 300 | 200 | 300 | 300 | 400 | 60 | 350 | 70 |
| | water absorption (%) | 2.2 | 2.5 | 2.8 | * | * | * | 2.8 | 4.7 | 2.3 | 2.2 | 2.4 | * | 2.6 | * |

BMI: bis(4-maleimidophenyl)methane
EP-828: bisphenol A type epoxy resin (Yuka Shell Co., Ltd., Epikote 828)
*: When the samples were broken, the water absorption could not be measured.

Table 1 shows that the aging time of plate of polystyrene (D 100) having average aromatic nuclei of 7.69 has poor steam resistance at a high temperature. On the other hand, the plates containing polystyrene A 5, A 50 or A 75 have excellent steam resistance. As the ratio of polystyrenes having 2-5 nuclei increases, steam resistance of the resulting cured product increases. Of polystyrenes A 5, A 50 and A 75, polystyrene A 5 is the most preferable with respect to a steam resistance.

EXAMPLE 2 (VERY LOW MOLECULAR WEIGHT POLYSTYRENE)

BPA-CN (880 parts), BMI (100 parts) and phenol novolak type epoxy resin (Yuka Shell Co., Ltd.; trade name: Epikote 152) (hereinunder referred to as EP-152) (20 parts) were subjected to preliminary reaction at 150° C. for 4 hours to form a prepolymer (hereunder referred to as Prepolymer A). To Prepolymer A (80 parts) were added cresol novolak type epoxy resin (Sumitomo Chemical Co., Ltd.; trade name: Sumiepoxy ESCN 220F) (hereinunder referred to as EP-220F) (5 parts) and polystyrene A 5 (15 parts). The mixture was dissolved in methyl ether ketone (MEK) to form a 60% varnish.

To the varnish were added dicumyl peroxide (0.1 part) and zinc octoate (0.05 parts) as a catalyst. A plain weave D glass cloth (SiO$_2$ content, 75 wt. %) 0.1 mm thick was impregnated with the varnish and heated at 140° C. for 6 minutes to form a B-staged prepreg.

Eight layers of the prepregs were sandwiched between two electrolytic copper foils 35 micron thick, and pressed at 40 kg/cm$^2$ and 175° C. for 2 hours to produce a two side copper-clad laminate 0.90 mm thick.

The above procedures were repeated by using components as given in Table 2. The results are shown in Table 2.

TABLE 2

| Component | | Ex. 1 | Control 2 | Ex. 3 | Ex. 4 |
|---|---|---|---|---|---|
| | Prepolymer A | 80 | 80 | | |
| | BPA-CN | | | 70 | 60 |
| | EP-220F | 5 | 5 | | |
| | A 5 | 15 | | 30 | 40 |
| copper foil peel strength (kg/cm) | | 1.9 | 1.4 | 1.7 | 1.7 |
| glass transition temperature (°C.) | | 210 | 220 | 185 | 180 |
| ε (1 MHz 25° C.) | | 3.5 | 4.0 | 3.5 | 3.5 |
| tan δ (1 MHz 25° C.) | | 0.0014 | 0.0034 | 0.0016 | 0.0016 |
| methylene chloride resistance (25° C., immersion for 20 minutes) | | no damage | no damage | no damage | no damage |
| solder resistance | normal state (350° C./1 min.) | no damage | no damage | no damage | no damage |
| | boiling for 8 hours (260° C./3 min.) | no damage | blister | no damage | no damage |

EXAMPLE 3 (POLYBROME DIPHENYL ETHER)

The procedures of Example 1 were repeated except that the components given in Table 3 were used. The results are shown in Table 3.

PCT was carried out at 2 atmospheres and 121° C. How many hours the appearances of the samples are impaired were measured (hereinunder referred to as "aging time"). Water absorptions after 100 hours (hereinunder referred to as water absorption) were also measured.

TABLE 3

| | | Ex. 1 | Ex. 2 | Ex. 3 | Ex. 4 | Control 5 | Ex. 6 | Control 7 | Ex. 8 | Control 9 |
|---|---|---|---|---|---|---|---|---|---|---|
| Resin components | BPA-CN | 95 | 90 | 80 | 70 | 100 | 76.5 | 76.5 | 42.5 | 42.5 |
| | TBBE | 5 | 10 | 20 | 30 | | 15 | | 15 | |
| | BMI | | | | | | 8.5 | 8.5 | 42.5 | 42.5 |
| | EP-152 | | | | | | | | | |

TABLE 3-continued

|  |  | Ex. 10 | Control 11 | Ex. 12 | Control 13 | Ex. 14 | Control 15 | Ex. 16 | Control 17 |
|---|---|---|---|---|---|---|---|---|---|
|  | EP-828 aging time (hrs.) | 600 | 700 | more than 1000 | more than 1000 | 300 | 600 | 500 | 200 | 200 |
| PCT | water absorption (%) | 2.7 | 2.3 | 1.8 | 1.8 | 3.2 | 2.3 | 2.8 | 3.8 | 5.3 |

| | | Ex. 10 | Control 11 | Ex. 12 | Control 13 | Ex. 14 | Control 15 | Ex. 16 | Control 17 |
|---|---|---|---|---|---|---|---|---|---|
| Resin components | BPA-CN | 80 | 80 | 42.5 | 42.5 | 67.5 | 67.5 | 38.5 | 38.5 |
| | TBBE | 15 | | 15 | | 15 | | 15 | |
| | BMI | | | | | 7.5 | 7.5 | 16.5 | 16.5 |
| | EP-152 | 5 | 5 | 42.5 | 42.5 | | | | |
| | EP-828 | | | | | 10 | 10 | 30 | 30 |
| PCT | aging time (hrs.) | more than 1000 | 500 | more than 1000 | 700 | more than 1000 | 500 | more than 1000 | 700 |
| | water absorption(%) | 1.5 | 3.3 | 0.9 | 2.3 | 1.9 | 3.6 | 1.8 | 3.5 |

TBBE: normally liquid mixture of polybromodiphenyl ether having an average bromine atoms of 4 (Dai-ichi Industrial Chemicals Ltd.; Pyrrogard SR-900)

EXAMPLE 4 (POLYBROME DIPHENYL ETHER)

To Prepolymer A (67 parts) were added EP-220F (16 parts) and TBBE (17 parts). The mixture was dissolved in MEK to form a 60% varnish.

To the varnish was added zinc octoate (0.05 parts) as a catalyst. A plain weave E glass cloth 0.1 mm thick was impregnated with the varnish and heated at 140° C. for 6 minutes to form a B-staged prepreg.

Eight layers of the prepregs were sandwiched between two electrolytic copper foils 35 micron thick, and pressed at 40 kg/cm² and 175° C. for 2 hours to produce a two side copper-clad laminate 0.90 mm thick.

The above procedures were repeated by using components as given in Table 4. The results are shown in Table 4.

TABLE 4

| | | Ex. 1 | Control 2 | Control 3 | Control 4 |
|---|---|---|---|---|---|
| resin component (parts) | Prepolymer A | 67 | 67 | 67 | 67 |
| | EP-220F | 16 | 16 | 16 | 16 |
| | TBBE | 17 | | | |
| | Epicuron 153 | | 17 | | |
| | Jupilon FR-83 | | | 17 | |

TABLE 4-continued

| | Ex. 1 | Control 2 | Control 3 | Control 4 |
|---|---|---|---|---|
| (25° C., immersion for 20 minutes) | | | | |
| solder resistance normal state (350° C./1 min.) | no damage | no damage | blister | blister |
| boiling for 8 hours (260° C./3 mins.) | no damage | blister | blister | blister |

Epicuron 153: bromonated bisphenol A type epoxy resin (Dai-Nippon Ink Chemical Co., Ltd.)
Jupilon FR-83: bromonated polycarbonate oligomer (Mitsubishi Gas Chemical Co., Inc.)

EXAMPLE 5 (TERPHENYL)

The procedures of Example 1 were repeated except that the components given in Table 5 were used, and biphenyl (Control 1), o-terphenyl (Example 2) or m-terphenyl (Example 3) was melt-blended at 100° C. and p-terphenyl (Example 4) or 1,3,5-triphenylbenzene (Example 5) was melt-blended at 150° C. The results are shown in Table 5.

TABLE 5

| | | Control 1 | Ex. 2 | Ex. 3 | Ex. 4 | Control 5 | Control 6 | Ex. 7 | Ex. 8 | Ex. 9 | Ex. 10 | Control 11 | Ex. 12 | Control 13 | Ex. 14 | Control 15 |
|---|---|---|---|---|---|---|---|---|---|---|---|---|---|---|---|---|
| Resin Component | BPA-CN | 85 | 85 | 85 | 85 | 85 | 100 | 90 | 80 | 70 | | | 67.5 | 67.5 | 38.5 | 38.5 |
| | BPS-CN | | | | | | | | | | 85 | 100 | | | | |
| | biphenyl | 15 | | | | | | | | | | | | | | |
| | o-terphenyl | | 15 | | | | | 10 | 20 | 30 | 15 | | 15.0 | | 15.0 | |
| | m-terphenyl | | | 15 | | | | | | | | | | | | |
| | p-terphenyl | | | | 15 | | | | | | | | | | | |
| | 1,3,5-triphenylbenzene | | | | | 15 | | | | | | | | | | |
| | BMI | | | | | | | | | | | | 7.5 | 7.5 | 16.5 | 16.5 |
| | EP-828 | | | | | | | | | | | | 10.0 | 10.0 | 30.0 | 30.0 |
| PCT | aging time (hrs.) | 150 | 250 | 250 | 300 | 60 | 50 | 200 | 300 | 300 | 150 | 50 | 300 | 60 | 250 | 70 |
| | water absorption (%) | 2.8 | 2.8 | 2.7 | 2.0 | * | * | 4.8 | 2.6 | 2.5 | 3.0 | * | 2.9 | * | 3.0 | * |

*: Measurement was impossible, because the samples were broken. The biphenyl has a boiling point of 255° C.

| | | | | |
|---|---|---|---|---|
| copper foil peel strength (kg/cm) | 1.7 | 1.4 | 1.5 | 1.5 |
| glass transition temperature (°C.) | 200 | 211 | 198 | 205 |
| ε (1 MHz 25° C.) | 4.1 | 4.2 | 4.3 | 4.1 |
| tan δ (1 MHz 25° C.) | 0.0027 | 0.0036 | 0.0058 | 0.0030 |
| methylene chloride resistance | no damage | no damage | no damage | rough surface |

EXAMPLE 6 (TERPHENYL)

To Prepolymer A (80 parts) were added EP-220F (5 parts) and o-terphenyl (15 parts). The mixture was dissolved in MEK to form a 60% varnish.

To the varnish was added zinc octoate (0.05 parts) as a catalyst. The plain weave D glass cloth of Example 2 was impregnated with the varnish and heated at 140° C. for 6 minutes to form a B-staged prepreg.

Eight layers of the prepregs were sandwiched between two electrolytic copper foils 35 micron thick, and pressed at 40 kg/cm$^2$ and 175° C. for 2 hours to produce a two side copper-clad laminate 0.90 mm thick. The results are shown in Table 6.

TABLE 6

| | | Example 1 | Control 2 of Example 2 |
|---|---|---|---|
| Component | Prepolymer A | 80 | 80 |
| | EP-220F | 5 | 5 |
| | o-terphenyl | 15 | |
| copper foil peel strength (kg/cm) | | 1.7 | 1.4 |
| glass transition temperature (°C.) | | 205 | 220 |
| ε | (1 MHz 25° C.) | 3.6 | 4.0 |
| tan δ | (1 MHz 25° C.) | 0.0014 | 0.0034 |
| methylene chloride resistance (25° C., immersion for 20 minutes) | | no damage | no damage |
| solder resistance | normal state (350° C./1 min.) | no damage | no damage |
| | boiling for 8 hours (260° C./3 mins.) | no damage | blister |

EXAMPLE 7 (PHENYLXYLYLETHANE)

The procedures of Example 1 were repeated except that the components given in Table 7 were used. The results are shown in Table 7.

SAL-LH means normally liquid phenylexylylethane (Nippon Oil Co., Ltd., Nisseki Hisol SAS-LH).

TABLE 7

| | | Ex. 1 | Ex. 2 | Ex. 3 | Ex. 4 | Control 5 | Ex. 6 | Control 7 | Ex. 8 | Control 9 |
|---|---|---|---|---|---|---|---|---|---|---|
| Component | BPA-CN | 95 | 90 | 85 | 70 | 100 | 76.5 | 76.5 | 42.5 | 42.5 |
| | SAS-LH | 5 | 10 | 15 | 30 | | 15 | | 15 | |
| | BMI | | | | | | 8.5 | 8.5 | 42.5 | 42.5 |
| | EP-152 | | | | | | | | | |
| | EP-828 | | | | | | | | | |
| PCT | aging time (hrs.) | 200 | 300 | 400 | 450 | 50 | 350 | 40 | 350 | 40 |
| | water absorption (%) | 3.8 | 2.9 | 2.6 | 2.5 | * | 3.1 | * 3.1 | * | |

| | | Ex. 10 | Control 11 | Ex. 12 | Control 13 | Ex. 14 | Control 15 | Ex. 16 | Control 17 |
|---|---|---|---|---|---|---|---|---|---|
| Component | BPA-CN | 80 | 80 | 42.5 | 42.5 | 67.5 | 67.5 | 38.5 | 38.5 |
| | SAS-LH | 15 | | 15 | | 15 | | 15 | |
| | BMI | | | | | 7.5 | 7.5 | 16.5 | 16.5 |
| | EP-152 | 5 | 5 | 42.5 | 42.5 | | | | |
| | EP-828 | | | | | 10 | 10 | 30 | 30 |
| PCT | aging time (hrs.) | 500 | 60 | 600 | 400 | 500 | 60 | 500 | 70 |
| | water absorption (%) | 2.1 | * | 1.8 | 3.0 | 2.6 | * | 2.9 | * |

*: Measurement was impossible, because the samples were broken.
SAS-LH: phenylxylylethane (Nippon Petroleum Co., Ltd.)

EXAMPLE 8 (PHENYLXYLYLETHANE)

The procedures of Example 6 were repeated except that the components given in Table 8 were used. The results are shown in Table 8.

TABLE 8

| | | Example 1 | Control 2 of Example 2 |
|---|---|---|---|
| Component | Prepolymer A | 80 | 80 |
| | EP-220F | 5 | 5 |
| | SAS-LH | 15 | |
| copper foil peel strength (kg/cm) | | 1.7 | 1.4 |
| glass transition temperature (°C.) | | 210 | 220 |
| ε | (1 MHz 25° C.) | 3.6 | 4.0 |
| tan δ | (1 MHz 25° C.) | 0.0014 | 0.0034 |
| methylene chloride resistance (25° C., immersion for 20 minutes) | | no damage | no damage |
| solder resistance | normal state (350° C./1 min.) | no damage | no damage |
| | boiling for 8 hours (260° C./3 mins.) | no damage | blister |

EXAMPLE 9 (AROMATIC HYDROCARBON RESIN)

The procedures of Example 1 were repeated except that components given in Table 9 were used. The term "NIKANOL" used means normally liquid xylene resins produced and sold by Mitsubishi Gas Chemical Co., Ltd. Kinds of NIKANOL and properties are as follows.

| Trade name | Mn | Amount of oxygen contained (%) | Number of aromatic nuclei per molecule | Proportion of xylene resins having 2-5 nuclei (%) |
|---|---|---|---|---|
| NIKANOL DS | 250 | 0 | 2 | 100.0 |
| NIKANOL LLL | 330-350 | 9-10 | 2.6 | |
| NIKANOL LL | 350-380 | " | 2.8 | |
| NIKANOL L | 380-420 | " | 3.11 | 69.5 |
| NIKANOL H | 460-500 | 10-11 | 3.24 | 50.7 |

Resin X90L and Resin X65M are the resins in which aromatic hydrocarbons having carbon atoms of 9 are bonded through methylene group. The resins are manufactured and sold by Mitsui Petroleum Chemical Co., Ltd. These resins have the following factors:

| | Number of aromatic nuclei | Proportion of resin having aromatic nuclei of 2-5 (%) | Bromine value | Acid value | Saponification value |
|---|---|---|---|---|---|
| Resin-X 90L | 4.5 | 75 | less than 1.0 | less than 0.1 | less than 1.0 |
| Resin-X 65M | 4.1 | 60 | less than 1.0 | less than 0.1 | less than 1.0 |

TABLE 9

| | | Control 1 | Ex. 2 | Ex. 3 | Ex. 4 | Ex. 5 | Control 6 | Ex. 7 | Ex. 8 | Ex. 9 | Ex. 10 |
|---|---|---|---|---|---|---|---|---|---|---|---|
| Resin component | BPA-CN | 85 | 85 | 85 | 85 | 85 | 100 | 95 | 90 | 80 | 70 |
| | NIKANOL DS | 15 | | | | | | | | | |
| | NIKANOL LLL | | 15 | | | | | | | | |
| | NIKANOL LL | | | 15 | | | 0 | 5 | 10 | 20 | 30 |
| | NIKANOL L | | | | 15 | | | | | | |
| | NIKANOL H | | | | | 15 | | | | | |
| PCT | aging time (hrs.) | 150 | 350 | 350 | 350 | 350 | 50 | 200 | 300 | 450 | 450 |
| | water absorption(%) | 3.9 | 1.7 | 1.8 | 2.0 | 2.0 | * | 3.6 | 2.5 | 1.7 | 1.6 |

| | | Ex. 11 | Ex. 12 | Control 13 | Ex. 14 | Control 15 |
|---|---|---|---|---|---|---|
| Resin component | BPA-CN | 67.5 | 38.5 | 38.5 | 80 | 80 |
| | NIKANOL L | 15.0 | 15.0 | | | |
| | NIKANOL H | | | | 15 | |
| | BMI | 7.5 | 16.5 | 16.5 | | |
| | EP-152 | | | | 5 | 5 |
| | EP-828 | 10.0 | 30.0 | 30.0 | | |
| PCT | aging time (hrs.) | 500 | 450 | 79 | 500 | 60 |
| | water absorption(%) | 2.5 | 2.6 | * | 2.3 | * |

| | | Ex. 16 | Ex. 17 | Ex. 18 | Ex. 19 |
|---|---|---|---|---|---|
| Resin component | BPA-CN | 90 | 80 | 90 | 80 |
| | Resin X90L | 10 | 20 | | |
| | Resin X65M | | | 10 | 20 |
| PCT | aging time (hrs.) | 250 | 350 | 200 | 250 |
| | water absorption (%) | | 3.8 | 2.6 | 4.5 | 2.9 |

In Table 9, "*" means that measurement was impossible, because the samples were broken.

EXAMPLE 10 (AROMATIC HYDROCARBON RESIN)

The procedures of Example 6 were repeated except that the components given in Table 10 were used. The results are shown in Table 10.

TABLE 10

| | | Example 1 | Control 2 of Example 2 |
|---|---|---|---|
| Component | Prepolymer A | 80 | 80 |
| | EP-220F | 5 | 5 |
| | NIKANOL LL | 15 | |
| copper foil peel strength (kg/cm) | | 1.9 | 1.4 |
| glass transition temperature (°C.) | | 215 | 220 |
| ε | (1 MHz 25° C.) | 3.6 | 4.0 |
| tan δ | (1 MHz 25° C.) | 0.0014 | 0.0034 |
| methylene chloride resistance | | no damage | no damage |

TABLE 10-continued

| | | Example 1 | Control 2 of Example 2 |
|---|---|---|---|
| (25° C., immersion for 20 minutes) | | | |
| solder resistance | normal state (350° C./1 min.) | no damage | no damage |
| | boiling for 8 hours (260° C./3 mins.) | no damage | blister |

EXAMPLE 11 (COUMARONE-INDENE RESIN)

BPA-CN and each of normally solid coumarone-indene resins (Shin-nittetsu Chemical Co., Ltd.; Cumarone Resin) as shown in the following table was melt-blended in proportion as given in Table 11, cast into a mold at 100° C., heated at 100° C. and 2 mmHg and evacuated in the state for 15 minutes.

| Trade name | $\overline{Mn}$ | Softening point (°C.) | Bromine value | Acid value | Number of aromatic nuclei | Number of functional groups |
|---|---|---|---|---|---|---|
| Cumarone Resin G-75 | 510 | 78 | 14 | 0.16 | 4.5 | 0.45 |
| Cumarone Resin G-90 | 625 | 93 | 13 | 0.18 | 5.5 | 0.5 |
| Cumarone Resin T-105 | 650 | 107 | 11 | 0.13 | 5.7 | 0.45 |

Thereafter, the compositions were heat-cured in an oven at 180° C. for 8 hours and at 240° C. for additional 12 hours to obtain cast plates 4 mm thick. The resulting plates were subjected to PCT. The results are shown in Table 11.

TABLE 11

| | | Ex. 1 | Ex. 2 | Ex. 3 | Control 4 | Ex. 5 | Ex. 6 | Ex. 7 | Ex. 8 |
|---|---|---|---|---|---|---|---|---|---|
| Component | BPA-CN | 85 | 85 | 85 | 100 | 95 | 90 | 80 | 70 |
| | Cumarone Resin G-75 | 15 | | | | | | | |
| | Cumarone Resin G-90 | | 15 | | | 5 | 10 | 20 | 30 |
| | Cumarone Resin T-105 | | | 15 | | | | | |
| PCT | aging time (hrs.) | 250 | 250 | 250 | 50 | 150 | 200 | 250 | 200 |
| | water absorption (%) | 1.9 | 2.2 | 2.5 | * | 3.9 | 3.3 | 2.8 | 3.1 |

| | | Control Ex. 9 | Ex. 10 | Control Ex. 11 | Control 12 |
|---|---|---|---|---|---|
| Component | BPA-CN | 80 | 80 | 38.5 | 38.5 |
| | Cumarone Resin G-75 | 15 | | | |
| | Cumarone Resin G-90 | | | 15.0 | |
| | EP-828 | | | 30.0 | 30.0 |
| | EP-152 | | 5 | | |
| | BMI | | | 16.5 | 16.5 |
| PCT | aging time (hrs.) | 300 | 60 | 250 | 70 |
| | water absorption (%) | 2.5 | * | 2.8 | * |

*Measurement was impossible, because the samples were broken.

EXAMPLE 12 (COUMARONE-INDENE RESIN)

The procedures of Example 6 were repeated except that the components given in Table 12 were used. The results are shown in Table 12.

TABLE 12

| | | Example 1 | Control 2 of Example 2 |
|---|---|---|---|
| Component | Prepolymer A | 80 | 80 |
| | EP-220F | 5 | 5 |
| | Cumarone Resin G-90 | 15 | |
| copper foil peel strength (kg/cm) | | 1.9 | 1.4 |
| glass transition temperature (°C.) | | 205 | 220 |
| ε | (1 MHz 25° C.) | 3.6 | 4.0 |
| tan δ | (1 MHz 25° C.) | 0.0025 | 0.0034 |
| methylene chloride resistance (25° C., immersion for 20 minutes) | | no damage | no damage |
| solder resistance | normal state (350° C./1 min.) | no damage | no damage |
| | boiling for 8 hours | no damage | blister |
| | (260° C./3 mins.) | - | |

EXAMPLE 13 (ANTHRACENE)

BPA-CN, normally solid anthracene, BMI, EP-152 and EP-828 were used in amounts as given in Table 13. The Examples of Nos. 1–5 were melt-blended at 150° C. for 6 hours; the samples of Nos. 6–13 were melt-blended at 150° C. for 10 minutes; and the samples of Nos. 14–17 were melt-blended at 150° C. for 3 hours, thereby forming prepolymers.

Each of the prepolymers was heated at 80° C., cast into a mold and evacuated at 100° C. and 2 mmHg for 15 minutes.

Thereafter, the compositions were heat-cured in an oven at 180° C. for 8 hours and at 240° C. for additional 12 hours to obtain cast plates 4 mm thick. The resulting plates were subjected to PCT. The results are shown in Table 13. Water absorption[60] means water absorption after 60 hours.

TABLE 13

| | | Ex. 1 | Ex. 2 | Ex. 3 | Ex. 4 | Control 5 | Ex. 6 | Control 7 | Ex. 8 | Control 9 |
|---|---|---|---|---|---|---|---|---|---|---|
| Component | BPA-CN | 95 | 90 | 85 | 70 | 100 | 76.5 | 76.5 | 42.5 | 42.5 |
| | anthracene | 5 | 10 | 15 | 30 | 0 | 15 | | 15 | |
| | BMI | | | | | | 8.5 | 8.5 | 42.5 | 42.5 |
| | EP-152 | | | | | | | | | |
| | EP-828 | | | | | | | | | |
| PCT | aging time (hrs) | 70 | 90 | 130 | 200 | 50 | 100 | 40 | 90 | 40 |
| | water absorption[60] (%) | 5.0 | 4.5 | 3.9 | 3.0 | * | 4.3 | * | 4.7 | * |

| | | Ex. 10 | Control 11 | Ex. 12 | Control 13 | Ex. 14 | Control 15 | Ex. 16 | Control 17 |
|---|---|---|---|---|---|---|---|---|---|
| | BPA-CN | 80 | 80 | 42.5 | 42.5 | 67.5 | 67.5 | 38.5 | 38.5 |

TABLE 13-continued

|  |  |  |  |  |  |  |  |  |
|---|---|---|---|---|---|---|---|---|
|  | anthracene | 15 |  | 15 |  | 15 |  | 15 |
| Compo- | BMI |  |  |  |  | 7.5 | 7.5 | 16.5 | 16.5 |
| nent | EP-152 | 5 | 5 | 42.5 | 42.5 |  |  |  |  |
|  | EP-828 |  |  |  |  | 10 | 10 | 30 | 30 |
|  | aging time (hrs) | 300 | 60 | 470 | 400 | 270 | 60 | 300 | 70 |
| PCT | water absorption[60] (%) | 2.6 | * | 1.9 | 3.0 | 2.8 | * | 2.7 | 5.8 |

*: Measurement was impossible, because the samples were broken.

EXAMPLE 14 (ANTHRACENE)

To Prepolymer A (80 parts) were added EP-220F (5 parts) and anthracene (15 parts). To the resulting mixture were added zinc octoate (0.1 part) and silica powder (100 parts). The mixture was blended by roll and grounded to form a molding material.

The molding material was molded at 200° C. and 40 kg/cm$^2$ for 5 minutes, and cured at 200° C. for 2 hours in a temperature control unit to form a molding 2 mm thick. In control test, the above procedure was repeated except that anthracene was not used. The results are shown in Table 14.

TABLE 14

|  |  | Example 1 | Control 2 |
|---|---|---|---|
| Tg | (°C.) | 200 | 220 |
| ε | (1 MHz 25° C.) | 3.2 | 3.4 |
| tan δ | (1 MHz 25° C.) | 0.0014 | 0.0032 |
| CH$_2$Cl$_2$ resistance (25° C. 20 min.-immersion) |  | no damage | no damage |
| solder resistance | normal state (350° C./1 min.) | no damage | no damage |
|  | after boiling for 8 hours (260° C./3 mins.) | no damage | blister |

EXAMPLE 15 (TWO OR MORE AROMATIC COMPOUNDS)

BPA-CN (80 parts), very low molecular weight polystyrene A 5 (10 parts) and aromatic hydrocarbon resin X-90L (10 parts) was melt-blended by heating it at 100° C., cast into a mold, heated at 100° C. and 2 mmHg and evacuated in the state for 15 minutes. The resulting prepolymer was cured in an oven at 180° C. for 8 hours and at 240° C. for additional 12 hours to obtain a cast plate 4 mm thick. The plate was subjected to PCT as in Example 1. Aging time of the plate was 350 hours and water absorption (after 100 hours) thereof was 2.7%.

As in Example 4, Prepolymer A of EP-153, EP-152, polystyrene A 5, TBBE and zinc octoate (0.05 parts) (catalyst) were used as given in Table 15. Copper-clad plates were prepared as in Example 4. The results are shown in Table 15.

TABLE 15

|  |  | Example 2 | Example 3 | Control 4 |
|---|---|---|---|---|
| Compo- | Prepolymer A | 50 | 70 | 50 |
| nent | polystyrene A 5 | 10 | 10 |  |
|  | TBBE | 10 | 15 |  |
|  | EP-153 | 5 |  | 16 |
|  | EP-152 | 25 | 5 | 34 |
| copper foil peel strength (kg/cm) |  | 1.6 | 1.6 | 1.6 |
| Tg | (°C.) | 175 | 185 | 180 |
| ε | (1 MHz 25° C.) | 4.0 | 3.5 | 4.1 |
| tan δ | (1 MHz 25° C.) | 0.0023 | 0.0015 | 0.0032 |
| CH$_2$Cl$_2$ resistance (25° C./20 min.-immersion) |  | no damage | no damage | no damage |
| solder resistance (280° C./ 1 min.) | 40°C., 90% 1 day 3 days 5 days | no damage no damage no damage | no damage no damage no damage | no damage blister blister |

TABLE 15-continued

|  |  | Example 2 | Example 3 | Control 4 |
|---|---|---|---|---|
|  | 10 days | no damage | no damage | blister |
| test for flammability UL (94) |  | V-O | V-O | V-O |

The above experiments show the following:

When the aromatic compounds (component II) have the following characteristics, the desired effectiveness can be achieved.

(1) They are free from any functional group that would be reactive with a cyanato group, or they have only a small amount of such a functional group.

(2) When they have a functional group, the functional group which causes self-polymerization or allows the polymer of component II to be formed is slim.

(3) Their molecular weight is in the range of 178-800; they have aromatic nuclei of 2-6; the major proportion of the latter have aromatic nuclei of 3-5; and they have a boiling point of more than 300° C. (When they are polybromodiphenyl ether having 2 aromatic nuclei, the compounds are high-boiling-point compounds, because of the bromine atoms substituted on the nucleus).

(4) They are non-branched and linear.

(5) They can be dissolved in a polyfunctional cyanate ester compound.

It is postulated that component (II), without retarding a reaction for the formation of a sym-triazine ring through trimerization of cyanato groups during curing, is taken into voids in a cross-linked structure being formed, thereby producing a kind of "clathrate compound" in which component (II) is dispersed and fixed in molecular state. As a result, the space available for permeation of the molecules of water is significantly decreased to prevent water from hydrolyzing weak portions in the cross-linked structure. Component (II) used has a high boiling point and is highly miscible with the cyanate resin component. This contributes to a reduced activity of the component (II) and ensures that it will not escape by diffusion from voids in the cross-linked structure even under elevated temperatures. It is also speculated either the absolute quantity of polar groups is reduced or their movement is inhibited, thereby contributing to improvements in dielectric constant and dielectric tangent.

What is claimed is:

1. A thermosetting resin composition comprising:
(I) a cyanate ester compound selected from the group consisting of a polyfunctional cyanate ester having at least two cyanato ester groups, a prepolymer of such a cyanate ester and mixtures thereof, characterized in that said composition contains
(II) at least one non-branched aromatic compound in an amount of 5-40% by weight of the total resin composition, said aromatic compound having a number-average molecular weight of 178-800, an average number of aromatic nuclei of 2-6, and a boiling point of more than 300° C., and in which the portion having aromatic nuclei of 2-6 constitutes more than 50%.

2. The composition of claim 1 wherein the portion comprising the aromatic compound having aromatic nuclei of 2-6 constitutes more than 60% of the composition.

3. The composition of claim 1 wherein said aromatic compound (II) is used in an amount of 5-35% weight of the total resin composition.

4. The composition of claim 1 wherein said aromatic compound (II) is selected from the group consisting of
(i) compounds having the formula:

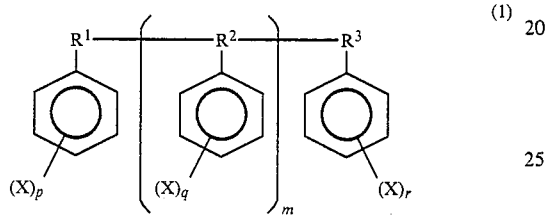
(1)

wherein each of $R^1$ and $R^3$ is independently —CHRCH$_2$—, >CRCH$_3$, >C=CH$_2$, —CR=CH— or

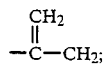

$R^2$ is >CR—CH$_2$— wherein R is hydrogen or methyl; X is halogen, alkyl having carbon atoms of 1-3 or alkoxy having carbon atoms of 1-3; m is 0.5-3; and p, q and r are independently 0 or an integer of 1-5;
(ii) compounds having the formula:

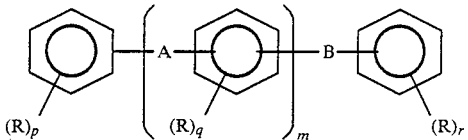
(2)

wherein A and B are the same or different, and A and B are independently replaced by a single bond, or A and B are independently —O—, lower alkylene having carbon atoms of 1-3, —CH$_2$O—, —CH$_2$OCH$_2$— or —CH$_2$OCH$_2$OCH$_2$—; R is the same or different, and is independently halogen, lower alkyl having carbon atoms of 1-3, lower alkoxy having carbon atoms of 1-3, or —CH$_2$OH; m is 0 or an integer of 1-3; p and r are independently 0 or an integer of 1-5; and q is 0 or an integer of 1-4;
(iii) a coumarone-indene resin having a softening point of 60°-120° C. or aromatic petroleum resin;
(iv) aromatic compounds selected from the group consisting of anthracene, phenanthrene and lower alkyl or bromo-substituted anthracene or phenanthrene; and
(v) mixtures thereof.

5. The composition of claim 4 wherein said aromatic compound is a compound having the formula (1).

6. The composition of claim 5 wherein said compound is styrene oligomer and the amount of unsaturated double bond is less than 0.2 per molecule.

7. The composition of claim 4 wherein said aromatic compound is a compound having the formula (2).

8. The composition of claim 7 wherein said compound is selected from the group consisting of polybromodiphenyl ether, diphenyl benzene, phenyl xylyl ethane and aromatic hydrocarbon resins.

9. The composition of claim 8 wherein said compound is an aromatic hydrocarbon resin.

10. The composition of claim 9 wherein said aromatic hydrocarbon resin is substantially free from any functional group.

* * * * *